United States Patent
He

(10) Patent No.: US 6,298,186 B1
(45) Date of Patent: Oct. 2, 2001

(54) PLANAR WAVEGUIDE GRATING DEVICE AND METHOD HAVING A PASSBAND WITH A FLAT-TOP AND SHARP-TRANSITIONS

(75) Inventor: Jian-Jun He, Ottawa (CA)

(73) Assignee: MetroPhotonics Inc., Ottawa (CA)

( * ) Notice: Subject to any disclaimer, the term of this patent is extended or adjusted under 35 U.S.C. 154(b) by 0 days.

(21) Appl. No.: 09/612,577

(22) Filed: Jul. 7, 2000

(51) Int. Cl.$^7$ ............................... G02B 6/34; H04J 14/02
(52) U.S. Cl. ............................... 385/37; 385/14; 385/39; 385/31; 385/129; 385/130; 385/131; 359/127; 359/130
(58) Field of Search ................................. 385/14, 39, 31, 385/129, 130, 131, 37, 24; 359/127, 130

(56) References Cited

U.S. PATENT DOCUMENTS

| | | | |
|---|---|---|---|
| 5,412,744 | 5/1995 | Dragone | 385/24 |
| 5,467,418 | 11/1995 | Dragone | 385/37 |
| 5,617,234 | * 4/1997 | Koga et al. | 385/37 X |
| 5,629,992 | 5/1997 | Amersfoort et al. | 385/15 |
| 5,706,377 | 1/1998 | Li | 385/37 |
| 5,710,849 | * 1/1998 | Little et al. | 385/50 |
| 5,751,872 | * 5/1998 | Bissessur et al. | 385/37 |
| 5,841,919 | * 11/1998 | Akiba et al. | 385/37 |
| 5,845,022 | * 12/1998 | Doerr | 385/24 |
| 5,862,279 | * 1/1999 | Amersfoort et al. | 385/40 |
| 5,926,587 | 7/1999 | Chen et al. | 385/14 |
| 5,940,555 | * 8/1999 | Inaba et al. | 385/24 |
| 5,978,532 | 11/1999 | Rigny et al. | 385/46 |
| 6,049,640 | * 4/2000 | Doerr | 385/15 |
| 6,049,644 | * 4/2000 | Dragone | 385/37 |
| 6,064,783 | 5/2000 | Congdon et al. | 385/15 |

OTHER PUBLICATIONS

K. Okamoto and A. Sugita, "Flat spectral response arrayed waveguide grating multiplexer with parabolic waveguide horns" Electron. Lett. 32, pp. 1661–1662 (1996).

M. R. Amersfoort et al., "Phased array wavelength demultiplexer with flattened wavelength response", Electron. Lett. 30, pp. 300–301 (1994).

J. B. D. Soole et al., "Use of multimode interference couplers to broaden the passband of wavelength–dispersive integrated WDM filters", IEEE Photon. Tech. Lett. 8, pp. 1340–1342 (1996).

G. H. B. Thompson et al., "An original low–loss and pass–band flattened SiO2 on Si planar wavelength demultiplexer", OFC Technical Digest, TuN1 (1998).

Okamoto and H. Yamada, "Arrayed waveguide grating multiplexer with flat spectral response", Optics Lett. 20, pp. 43–45 (1995).

A. Rigny et al., "Multigrating method for flattened spectral response wavelength multi/demultiplexer", Electronics. Letters 33, pp. 1701–1702 (1997).

Boerk et al, "Passband flattening of phasar WDM using input and output star couplers designed with two focal points", OFC Tech Dig., pp. 302–303 (1997).

J.–J. He et al, "Monolithic integrated wavelength demultiplexer based on a waveguide Rowland circle grating in InGaAsP/InP", IEEE J. Lightwave Tech. 16, pp. 631–638 (1998).

(List continued on next page.)

*Primary Examiner*—Brian Healy
(74) *Attorney, Agent, or Firm*—Freedman & Associates

(57) ABSTRACT

A passband flattened waveguide grating device and a method of designing the same are disclosed wherein the resulting spectral response has a wide flat passband and steep transitions. The method involves adjusting the phases of grating elements forming the grating to achieve the desired spectral response. The phase variation between adjacent grating elements comprises of, in addition to a multiple of $2\pi$, a slow-varying central phase variation and an oscillatory phase variation. The resulting spectral response of the waveguide device accounts for the effect of convolution of the field distribution profiles of the input port and of the output ports of the device.

45 Claims, 11 Drawing Sheets

OTHER PUBLICATIONS

F. Farjady et al., "Nonlinear phase apodisation techniques for arrayed–waveguide grating passband control", IEE Colloquium on Multiwavelength Optical Networks: Devices, Systems and Network Implementations, Ref. No. 1998/257, pp. 4/1–4/4 (1998).

P.C. Clemens et al, "Flat–Field Spectrograph in SiO2/Si", IEEE Photonic Tech. Letters vol. 4, No. 8, pp 886 (1992).

P.C. Clemens et al, "8–Channel Optical Demultiplexer Realized as Sio2/Si Flat–Field Spectrograph", IEEE Photonic Tech. Letters vol. 6, No. 9, pp. 1109–1111 (1994).

Marshall J. Cohen et al., "InGaAs photodiode arrays for DWDM monitoring and receiving", Lightwave, Aug. (1999).

* cited by examiner

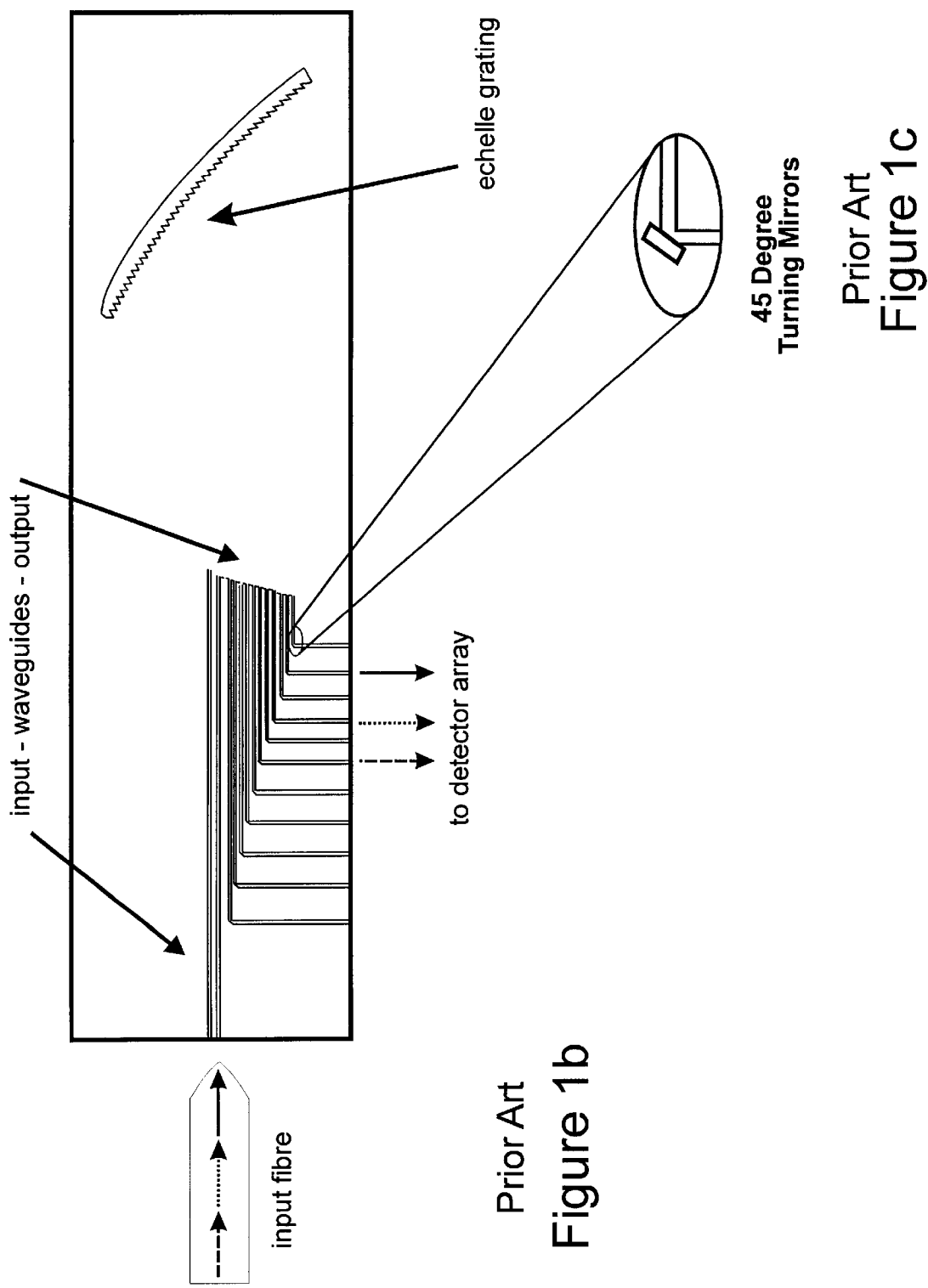

PLANAR WAVEGUIDE GRATING DEVICE AND METHOD HAVING A PASSBAND WITH A FLAT-TOP AND SHARP-TRANSITIONS

BACKGROUND OF THE INVENTION

Planar waveguide grating devices have been widely used for wavelength multiplexing/demultiplexing, routing and optical add-drop applications in dense wavelength-division multiplexing (DWDM) networks. Commonly, this is accomplished with either an arrayed waveguide grating (AWG), or an etched reflecting or transmissive diffraction gratings shown in FIGS. 1a and 1b. When the device performs a demultiplexing function, multiple signal channels of different wavelengths launched into an input waveguide of the device are separated and each signal channel is directed to a predetermined output waveguides of a plurality of output waveguides. A typical spectral response of such a device is shown in FIG. 2.

One of the most desired features of such devices is a spectral response having wide and flat response characteristics within a passband of each signal channel. This feature allows high modulation frequency or data rate of the incoming signal. Further, a spectral response graph having a flat wide portion throughout the passband is indicative of a device with a large tolerance to wavelength drift of an input signal received at the input waveguide and tolerant to passband wavelength drift of the device resulting from, for example, temperature variation. Also, a spectral response as indicated above reduces the effect of polarization dispersion resulted from the planar waveguide geometry. Moreover, a device having such a flat and wide passband is particularly important in WDM networks where multiple filters are cascaded and the cumulative passband is much narrower than that of a single stage filter.

It is also highly desirable that the transmission coefficient drops sharply at the edges of the passband within the spectral response so that adjacent channels can be closely spaced without causing unacceptable crosstalk. Evidently, a sharper change in transmission coefficient also results in signals within the passband being passed with approximately equivalent attenuation, thereby, rendering the entire passband similar in response.

In a planar waveguide demultiplexing device such as the one shown in FIG. 1, the shape of the spectral response is determined by a convolution of the amplitude distribution at the output focal plane, an image of the input waveguide mode profile formed by the grating, with the mode profile of the output waveguide. The channel spectral response is approximately Gaussian shaped when single-mode waveguides are used for both input waveguide and output waveguide in a conventional device. The passband is narrow, the passband top is not flat and the transition is slow. Typically, a standard 50 GHz spacing demultiplexer has a 1 dB-passband of about 8~12 GHz.

Many improved designs have been proposed to flatten and widen the passband spectral response. However, they all have limitations and drawbacks.

In an article entitled "Phased array wavelength demultiplexer with flattened wavelength response" by M. R. Amersfoort et al., Electron. Lett. 30, pp. 300–301 (1994), multimode output waveguides are used to flatten the spectral response within the passband in an AWG demultiplexer. The same method is used in etched grating based demultiplexers in a paper entitled "Monolithic integrated wavelength demultiplexer based on a waveguide Rowland circle grating in InGaAsP/InP" by J.-J. He et al, IEEE J. Lightwave Tech. 16, pp. 631–638 (1998). This method can only be used in a receiver device where the output signals of the demultiplexer are immediately converted to electronic signals by photodetectors. It cannot be used if the output signals are to be coupled into optical fibers or single-mode waveguides as in the case of wavelength routing and optical add-drop devices.

In U.S. Pat. No. 5,412,744 entitled "Frequency routing device having wide and substantially flat passband" by C. Dragone (issued May 1995), two output waveguides are combined using an optical coupler. Since each channel takes the space of two waveguides at the output plane, it limits the total number of ports that can be provided. Also, the coupler introduces a loss of at least 3 dB. In U.S. Pat. No. 5,706,377 entitled "Wavelength routing device having wide and flat passbands" by Y. P. Li (issued January 1998), the passband was further widened at the expense of further increased loss by using Y-branch couplers/splitters in both the input and output sides.

Several patents and publications exist which widen the passband and flatten the spectral response within the passband by broadening the input source. In an article entitled "Flat spectral response arrayed waveguide grating, multiplexer with parabolic waveguide horns" by K. Okamoto and A. Sugita, Electron. Lett. 32, pp. 1661–1662 (1996), a parabolic tapered waveguide horn is used at the input waveguide. A double-peaked intensity distribution is formed at the input plane. This double-peaked distribution is imaged onto the output plane by a grating and result in a widened and flattened passband spectral response. This parabolic waveguide horn is replaced by a multimode interference coupler (MMI) in U.S. Pat. No. 5,629,992 entitled "Passband flattening of integrated optical filters" by M. Amersfoort and J. B. D. Soole (issued May 1997), and in a paper entitled "Use of multimode interference couplers to broaden the passband of wavelength-dispersive integrated WDM filters" by J. B. D. Soole et al., IEEE Photon. Tech. Lett. 8, pp. 1340–1342 (1996). In U.S. Pat. No. 6,049,644 entitled "Optical routing device having a substantially flat passband" by C. Dragone (issued April 2000), a wide input waveguide with a longitudinal slot in the middle is used to produce a double-peaked intensity distribution. In all these methods, the end width of the input waveguide is much larger than the ordinary single mode waveguides such as those used for output waveguides. This limits the number of input ports/waveguides and thus is not suitable for N×N routing devices. Moreover, those input waveguide end structures are very sensitive to fabrication errors.

Cascading two grating devices may also result in a flattened passband spectral response, as disclosed in a paper entitled "An original low-loss and pass-band flattened SiO2 on Si planar wavelength demultiplexer" by G. H. B. Thompson et al., OFC Technical Digest, TuN1 (1998) and in U.S. Pat. No. 5926587 entitled "Optical passband filters" by J. C. Chen and C. Dragone (issued July 1999). However, this method increases the device size and transmission losses.

In the article "Arrayed waveguide grating multiplexer with flat spectral response" by Okamoto and H. Yamada, Optics Lett. 20, pp. 43–45 (1995), the complex amplitude distribution at the grating plane at the output star coupler is adjusted according to a cardinal sine (sinc) function. The intensity distribution at the output plane has thus the form of a rectangular function according to the Fourier transform principle. While the phase adjustment (or negative sign) required by the sinc distribution at certain array arms can be easily realized by adjusting the waveguide lengths, the amplitude adjustment is much more difficult. It is realized by varying the tapered entrance widths of the arrayed waveguides. A similar method is disclosed in U.S. Pat. No. 5,467,418 entitled "Frequency routing device having a spatially filtered optical grating for providing an increased passband width" by C. Dragone (issued November 1995), in which the amplitude distribution is realized by introducing losses in the arrayed waveguides using lateral displacements between two waveguide segments. A drawback of these methods is that the amplitude adjustment is difficult to control due to fabrication errors and it may increase losses, phase errors and crosstalk of the device significantly. Also, since a large portion of the grating has a negative phase and contributes destructively to the output, the resulting peak transmission intensity is reduced significantly. Furthermore, these methods only improve the amplitude distribution at the output focal plane, i.e. the image of the input source formed by the grating. The resulting shape of the spectral response is quite different from this spacial amplitude distribution because of the effect of convolution with the mode profile of the output waveguide. The improvement in the passband transition is thus very limited.

In an article entitled "Multigrating method for flattened spectral response wavelength multi/demultiplexer" by A. Rigny et al., Electronics. Letters 33, pp. 1701–1702 (1997), and in U.S. Pat. No. 5,978,532 entitled "Spectrographic multiplexer component having an array of waveguides" by the same authors, two arrays of waveguides with different path length differences are interleaved to flatten passband spectral response. The spectral response is effectively the sum of two Gaussian functions peaked at two slightly different wavelengths. The technique has the advantage of simplicity in terms of both design and fabrication. However, the simple method is obviously not the optimum solution and it does not improve the sharpness of the transition within the spectral response to and from the passband.

Passband flattening, flattening of the spectral response within the passband, can also be achieved by multiple-focal-point design in which the shape of star couplers in AWG devices are modified, as reported in a paper entitled "Passband flattening of phasar WDM using input and output star couplers designed with two focal points", by Boerk et al, OFC Tech Dig., pp. 302–303 (1997) and in another paper entitled "Flat channel-passband wavelength multiplexing and demultiplexing devices by multiple-Roland-circle design" by Y. P. Ho et al., IEEE Photonics Tech. Lett. 9, pp. 342–344 (1999). Similar to the multigrating design, the multi-focal-point design does not improve the steepness of transitions within the spectral response graph to and from the passband.

In an article entitled "Nonlinear phase apodisation techniques for arrayed-waveguide grating passband control" by F. Farjady et al., IEE Colloquium on Multiwavelength Optical Networks: Devices, Systems and Network Implementations, Ref. No. 1998/257, pp. 4/1–4/4 (1998), a sub-parabolic phase term is introduced in the arrayed waveguides. While the passband spectral response is broadened with this method, the width of the transition to and from the passband within the spectral response graph is increased significantly and the induced loss is excessive, result in a significant degradation in overall performance.

OBJECT OF THE INVENTION

In order to overcome these and other limitations of the prior art, it is an object of the present invention to provide a waveguide grating based (de)multiplexing device having a passband spectral response characterised by a flat-top and sharp-transitions.

SUMMARY OF THE INVENTION

In accordance with the invention there is provided a waveguide grating device having a spectral response that is a target spectral response compensating for the field distribution of the output port of the device such that the spectral response at the output port is close to the target spectral response. The spectral response is effected through phase variations between grating elements other than a variation of a multiple of $2\pi$ and other than a prior art slow varying phase variation. The use of a phase variation allows for the device to operate with increased optical efficiency. Alternatively, phase and intensity variations are used together.

In accordance with another aspect of the invention there is provided a waveguide grating device having a spectral response corresponding with each of a plurality of channels and having further peaks within the frequency response corresponding to frequencies approximately at a middle frequency between channels. Typically, the further peaks are much smaller than the peaks associated with the channels.

In a preferred embodiment the grating elements are disposed for varying a phase of light incident thereon, the phase variation between adjacent grating elements being the sum of:

a) a multiple of $2\pi$;

b) a slow-varying central phase variation;

c) an oscillatory phase variation, such that adjacent grating elements are disposed to vary the phase in an opposing direction from the central phase variation.

Therefore, in accordance with the invention there is provided a waveguide grating device comprising: a first port for receiving an optical signal having a plurality of channels therein, channels separated by a channel spacing within the frequency domain; a plurality of second ports for receiving optical signals each having a single channel; a grating region comprising a plurality of grating elements within the waveguide, the grating elements disposed for varying a phase of light propagating between the first port and one of the plurality of second ports via the grating elements, the phase variation between adjacent grating elements different than a multiple of $2\pi$, the difference being the sum of a slow-varying central phase variation and an oscillatory phase variation, resulting in a spectral response for the waveguide device that is substantially similar to a target spectral response within a working spectral range.

Preferably, the waveguide grating has a spectral response that is substantially flat within a passband thereof.

Preferably, the waveguide grating has steep sloping edges within the spectral response about the passband.

In accordance with another embodiment of the invention there is provided a waveguide grating device comprising:

a first port for receiving an optical signal having a plurality of channels therein, channels separated by a channel spacing within the frequency domain;

a plurality of second ports for receiving optical signals each having a single channel; and, a grating region comprising a plurality of grating elements within the waveguide, the grating elements disposed for varying a phase of light propagating between the first port and one of the plurality of second ports via the grating elements, the phase variation between adjacent grating elements different than a multiple of $2\pi$ selected to provide a spectral response of the waveguide grating device including any effects of field distribution profiles of the first port and of the second ports of the device having a substantially flat spectral response within a passband of the device and having steep sloping edges within the spectral response about the passband.

In accordance with yet another embodiment of the invention there is provided a waveguide grating device comprising: a first port for receiving an optical signal having a plurality of channels therein, channels separated by a channel spacing within the frequency domain; a plurality of second ports for receiving optical signals each having a single channel; and, a grating region comprising a plurality of grating elements within the waveguide, the grating elements disposed for varying the phase and amplitude of light propagating between the first port and any of the second ports via the grating elements, the phase and amplitude variations other than multiples of $2\pi$, multiples of (and determined in a predetermined manner in order to result in a spectral response of the waveguide device substantially similar within a working spectral range to a target spectral response.

In accordance with yet another embodiment of the invention there is provided a waveguide grating device comprising:

an input port for receiving light including a plurality of different signals each at a different wavelength and for providing the light with a first field distribution;

a plurality of grating elements within a grating region for receiving the light having a first field distribution and for dispersing the light in dependence upon a wavelength of the light incident upon each grating element with a first spectral response dependent upon a phase variation of the light introduced by each grating element;

a plurality of output ports each for receiving light of a predetermined wavelength and for providing therefrom the light having a second field distribution, wherein a combination of the first spectral response, the first field distribution and the second field distribution form a substantially flat spectral response within a passband of the device and steep sloping edges within the spectral response about the passband and substantially zero response elsewhere within a working spectral range.

According to another aspect of the invention there is also provided a method of designing a waveguide grating based on the field distribution of the output port and a frequency domain analysis of the spectral response of the device.

In an embodiment the method includes the steps of
a) calculating a modulus product of a grating plane amplitude distribution of light diffracted from the input port and an inverse Fourier transform of a field distribution of the output port;
b) providing a target spectral response for the waveguide grating device;
c) determining a phase distribution for grating elements forming the waveguide grating such that the phase distribution at the output grating plane in conjunction with the field distribution of the output port results in a spectral response of the waveguide grating device substantially similar to the target spectral response within a working spectral range; and,
d) providing the determined phase distribution of the grating elements as the design.

In an embodiment the step (c) comprises the steps of:
c1) providing a working spectral range not larger than the free spectral range of the waveguide grating;
c2) providing an initial estimate of complex spectrum;
c3) determining grating phase distribution using an inverse Fourier transform of the complex spectrum;
c4) determining an effective complex grating plane amplitude from the grating phase distribution and the product calculated in step a);
c5) determining a spectral amplitude and and a new spectral phase using the Fourier transform of the complex grating plane amplitude;
c6) determining a new complex spectrum within the working spectral range based on the target spectral amplitude and the determined spectral phase and having complex spectrum portions outside the working spectral range substantially similar to those resulting from a current iteration; and,
c7) iterating steps (c3) through (c6) until the spectral amplitude is within predetermined limits with respect to the target spectrum.

In accordance with another embodiment the invention comprises a method of designing a waveguide grating device having an input port, an output port, and a plurality of grating elements comprising the steps of:
a) calculating a modulus product of a grating plane amplitude distribution of light diffracted from the input port and an inverse Fourier transform of a field distribution of the output port;
b) providing a target spectral response;
c) providing an initial estimate of spectral phase;
d) determining a complex spectrum based on the target spectral response and the provided spectral phase;
e) determining grating phase distribution using an inverse Fourier transform of the complex spectrum;
f) determining an effective complex grating plane amplitude based on the grating phase distribution and the product calculated in step (a);
g) performing a Fourier transform of the complex grating plane amplitude to determine a spectral amplitude and a new estimate of spectral phase; and,
h) iterating steps (d) through (g) until a predetermined condition is met;
i) providing the determined phase distribution of the grating elements as the design when the spectral amplitude is within predetermined limits with respect to the target spectral response.

The method may further comprise the steps of
i) providing a working spectral range less than the free spectral range of the waveguide grating;
j) providing an initial estimate of complex spectrum determined in steps (a) through (h);
k) determining grating phase distribution using an inverse Fourier transform of the complex spectrum;
l) determining an effective complex grating plane amplitude from the grating phase distribution and the product calculated in step (a);
m) determining a spectral amplitude and a new spectral phase using the Fourier transform of the complex grating plane amplitude;
n) determining a complex spectrum within the working spectral range based on the target spectral amplitude and the determined spectral phase and having complex spectrum portions outside the working spectral range substantially similar to those resulting from a current iteration; and,
o) iterating steps (k) through (n) until the spectral amplitude is within predetermined limits with respect to the target spectrum.

In the device disclosed in this invention, the phases between the grating elements are modified in a predetermined manner to obtain an improved passband spectral response with minimum excess loss. The new method has the following characteristics: (1) the passband spectral response is broadened and flattened and transitions are steepened resulting in reduced crosstalk between adjacent channels; (2) in contrast to all prior art methods, passband spectral response is optimised for the final spectral response, i.e. after the convolution with the output mode profile is taken into account; (3) it can be used in both AWG and etched reflecting (or transmissive) diffraction grating; (4) both input and output waveguides are single mode without any complex fabrication-sensitive end structures; (5) no losses need be introduced in the grating elements in order to obtain a predetermined intensity distribution at the grating plane; (6) no additional waveguide element such as splitters and tapers are required to broaden the input or the output mode profiles; (7) phase modifications are small and can be realized simply with slight adjustments in the waveguide lengths in the case of AWG or by small shifts in the positions of the grating facets in the case of etched diffraction gratings resulting in simple fabrication requiring no additional processing; (8) the method can be combined with other passband flattening techniques such as those incorporating multimode output waveguides or input waveguide broadening structures.

BRIEF DESCRIPTION OF THE DRAWINGS

Exemplary embodiments of the invention will now be described in conjunction with the drawings, in which:

FIG. 1b is a prior art schematic diagram of a curved reflective diffraction grating (de)multiplexing device;

FIG. 1c is an enlarged schematic diagram of a prior art turning mirror integrated into the substrate of a diffraction grating;

FIG. 9a is the complete spectrum over a free spectral range for the passband flattened grating with the phase distribution of FIG. 8a;

DETAILED DESCRIPTION OF THE INVENTION

Figure 1A:
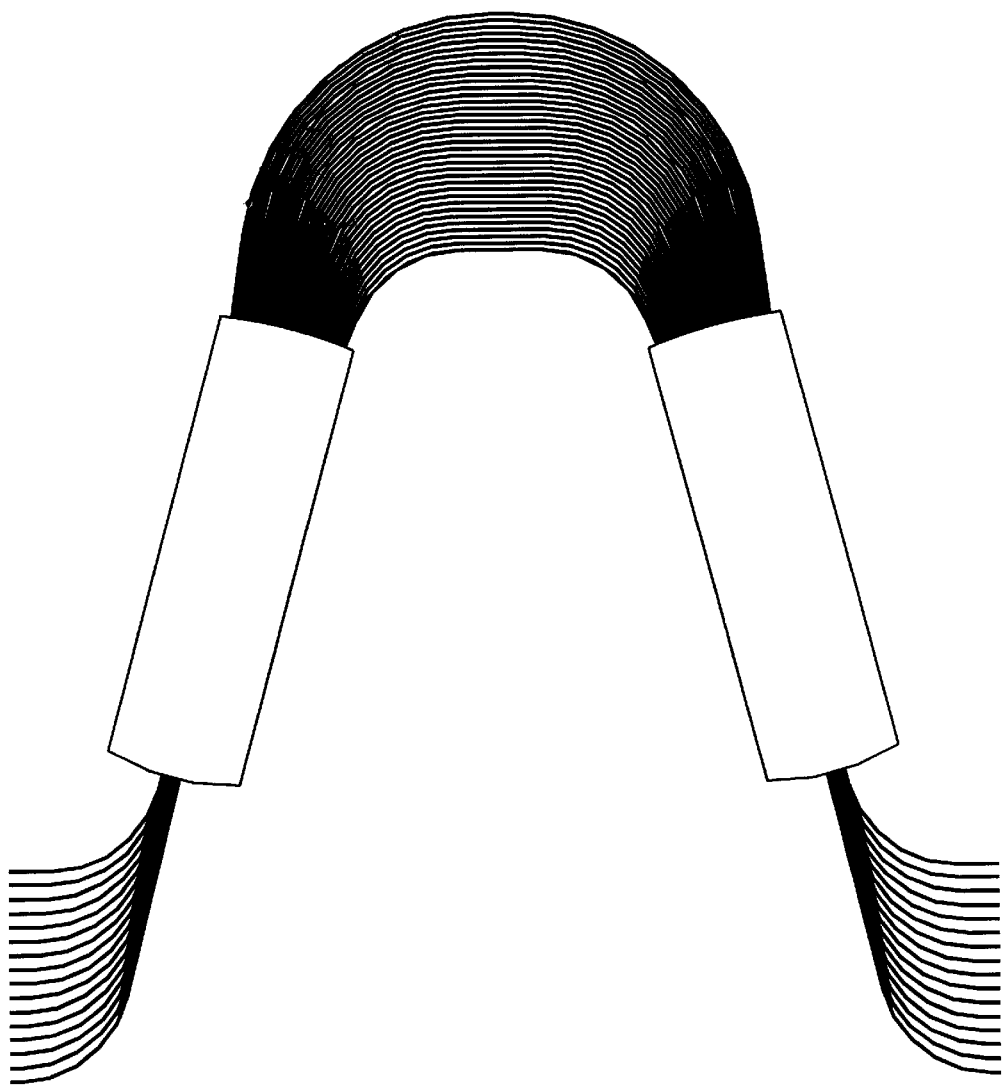
FIG. 1a is a prior art schematic diagram of an arrayed waveguide grating (AWG) device.

Referring to FIG. 1a, an arrayed waveguide grating device according to the prior art is shown. In FIG. 1b, an etched reflecting diffraction grating device according to the prior art is shown. The right angle bends in the waveguide of FIG. 1b are made possible with the turning mirror shown in FIG. 1c. When a prior art device performs a demultiplexing function, multiple signal channels of different wavelengths launched into an input waveguide are separated and each channel is directed to a predetermined one of the output waveguides. In the following, the planes containing the end of the input or output waveguides and perpendicular to them are referred as input plane and output plane, respectively.

The principles of operation of the two types of devices are similar in that they both contain a dispersive and focusing component consisting of an array of optical elements. Each of these elements introduces a slightly different optical path length for a beam traveling from an input to an output port. In an etched grating, this optical element is a reflecting mirror (grating facet) whereas in the case of an AWG, it is an optical waveguide.

Figure 2:
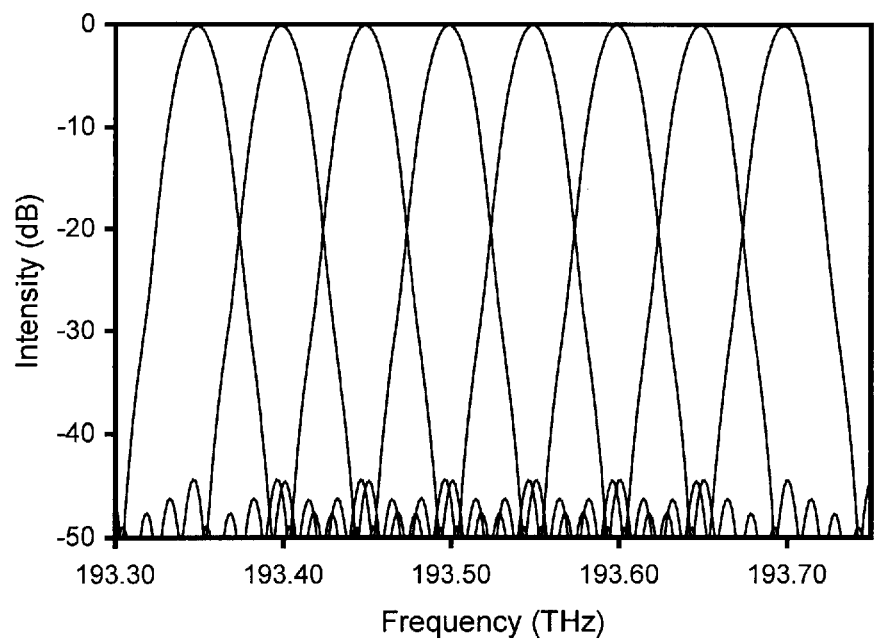
FIG. 2 is typical spectral responses of different channels in a standard prior art demultiplexing device.

FIG. 2 shows graphically typical behavior of the device, described by the spectral response, i.e., the transmission coefficient of each channel as a function of optical frequency.

Figure 10A:
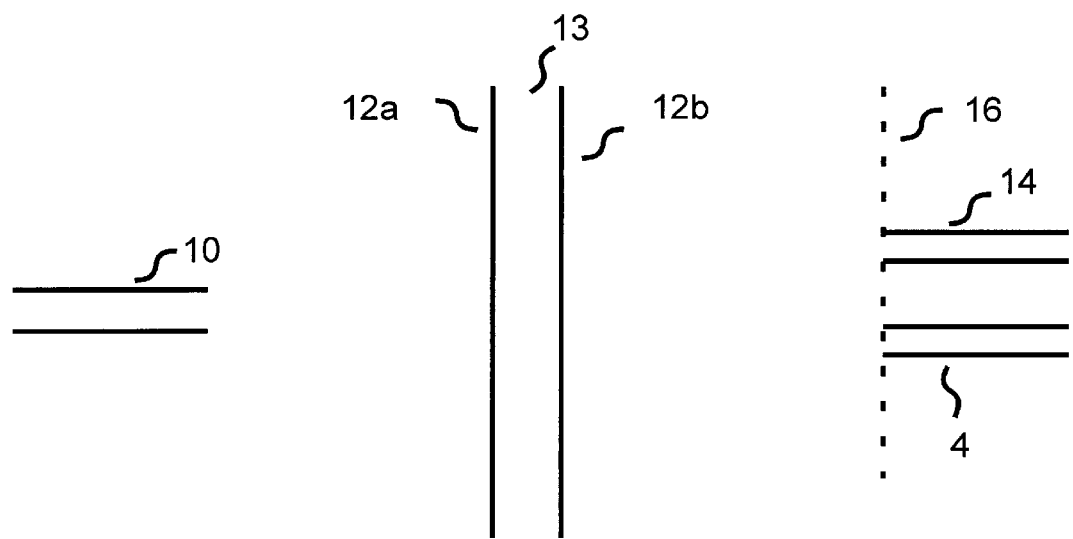
Figure 10B:
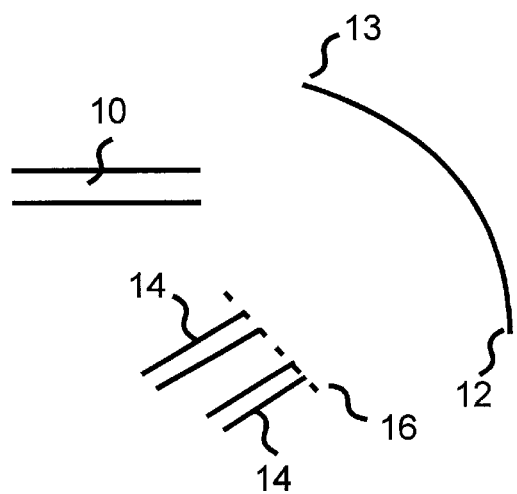

Referring to FIGS. 10a and 10b, a diagram of a grating device is shown. An input port 10 couples light into the grating region. Typically, waveguide grating devices are bi-directional optical components so it will be understood that the input port may also or alternatively used to couple light out of the grating region 13. The light propagates toward a grating plane 12 within the grating region 13. Though this "grating plane" 12 is described as such, it may take the form of a curved surface or some other arbitrary shaped surface as is evident to those of skill in the art based on the grating configuration selected. When the grating region 13 is a reflective grating region as shown in FIG. 10b, the grating plane 12 acts as both the input grating plane and the output grating plane. When the grating region 13 is transmissive such as an array waveguide grating, the output grating plane 12b is different from the input grating plane 12a. Once again, this is well known to those of skill in the art. The grating device also includes a plurality of output ports 14. Associated with each output port 14 is an output plane 16. This diagram is helpful in determining a location of light signals within the waveguide device in the description that follows.

The δ-dB bandwidth of a channel is often defined as the frequency or wavelength interval at the edges of which the transmission coefficient falls to δ dB below the peak transmission. The channel passband width is usually defined as 1 dB or 0.5 dB bandwidth. In this patent disclosure, without losing generality, we define the 1 dB bandwidth as the passband width $\Delta f_{PB}$. For a demultiplexing device requiring less than −30 dB crosstalk between adjacent channels, for example, the channel spacing should be larger than half of the sum of the passband and the 30-dB bandwidth.

The passband flatness can be described by the inverse of the largest slope in the spectral response within the passband. For Gaussian shaped response associated with single mode input and output waveguides, the largest slope occurs at the edges of the passband. We therefore define the passband flatness as $$\left(\frac{df}{dI}\right)_{-1\,dB}$$

where I is the spectral intensity in dB and the subscript denotes the value at −1 dB from the peak intensity. Similarly, we define the transition sharpness as the slope at −30 dB intensity, i.e., $$\left(\frac{dI}{df}\right)_{-30\,dB}.$$

Our purpose is therefore to increase $\Delta f_{PB}$, $$\left(\frac{df}{dI}\right)_{-1\,dB}$$

and $$\left(\frac{dI}{df}\right)_{-30\,dB}.$$

The passband reshaping technique of this invention is based on the Fourier transformation mechanism of the diffraction gratings. Below, the analytical formula for the spectral response of the grating is summarised.

Consider an output waveguide centered at x=0 in the output plane. Assume the central frequency of the channel is $f_c$. In a conventional grating, the phase difference between two adjacent grating elements is equal to a multiple of $2\pi$ for the central channel frequency $f_c$. The phase corresponding to the optical path from the input to the center of the output waveguide via the $l^{th}$ element can be expressed by $$\Phi_l = \Phi_0 + 2lm\pi \quad l = 1, 2, 3, \ldots N \quad (1)$$

where m is the grating order and N the number of grating elements.

For an optical frequency $f=f_c+\Delta f$ and for an output point slightly displaced from the waveguide center, the phase can be rewritten as $$\Phi_l = \Phi_0' + 2lm\pi + \frac{2lm\pi}{f_c}\left(\Delta f - \frac{x}{D}\right) \quad (2)$$

where $$D = \frac{dx}{df}$$

is the dispersion constant of the grating at the output plane. The field distribution at the output plane can be written as $$E(x) = g(u) = \sum_{l=1}^{N} G_l e^{-i2\pi l u} \quad (3)$$

where $G_l$ is a real number representing the effective field amplitude at the grating plane for $l^{th}$ element and $$u = \frac{m}{f_c}\left(\Delta f - \frac{x}{D}\right)$$

is a normalized variable in the space and spectral domain. In the case of etched diffraction grating, the facet size and the distances to the input and output waveguides are taken into account in the effective field distribution.

Equation (3) shows that the function g(u) is a discrete Fourier transform of the amplitude distribution in the grating plane. Therefore, the grating field distribution $E_l$ is obtainable from the function g(u) by using the inverse Fourier transform:

$$E_l = G_l = \int_{-\frac{1}{2}}^{\frac{1}{2}} g(u) e^{i2\pi l u} du \quad (4)$$

The channel spectral response of the demultiplexer is determined by the overlap integral of the field distribution at the output plane and the mode profile of the output waveguide:

$$I(\Delta f) = |A(\Delta f)|^2 = \left|\int_{Output} g\left(\frac{m}{f_c}\left(\Delta f - \frac{x}{D}\right)\right) p(x) dx\right|^2 \quad (5)$$

where p(x) is the normalized mode profile of the output waveguide and the integration is performed on the output plane. We can see that the amplitude of the spectrum $A(\Delta f)$ can be expressed by the following convolution:

$$A(\Delta f) = Dp(D\Delta f) \otimes g\left(\frac{m\Delta f}{f_c}\right) \quad (6)$$

In a conventional waveguide grating devices, the function g(u) reflects the image of the amplitude distribution at the input waveguide. In the central region of the image, it is almost a real function or otherwise stated, it has an almost constant phase distribution. In the case of single mode waveguides, both the function g(u) and p(x) are approximately Gaussian functions. The spectral amplitude distribution $A(\Delta f)$ is therefore also a Gaussian function with a squared width equal to the sum of the squared widths of the corresponding functions of g(u) and p(x) in the spectral domain.

The idea of this invention is to introduce an additional phase variation in the grating field distribution so that the resulting field distribution at the output plane as determined by its Fourier transform g(u) is a complex function. The convolution of this complex function with the output waveguide mode profile according to Eq. (6) results in a complex function A(Δf) whose amplitude is as close as possible to a rectangular function.

According to the present invention, a phase term ΔΦ$_l$ is added at each grating element. This is typically realized by slightly adjusting the waveguide lengths in the case of an AWG or by adjusting the positions of the reflecting facets in the case of an etched diffraction grating. Of course, other methods of phase adjustment are also possible in accordance with the invention. The amounts of the phase adjustments are determined by the method described below.

The maximum variation of ΔΦ$_l$ is small (less than $2\pi$), the dependence of ΔΦ$_l$ on frequency is therefore neglected. Equation (2) is rewritten as $$\Phi_l = \Phi'_0 + 2lm\pi + \Delta\Phi_l + \frac{2lm\pi}{f_c}\left(\Delta f - \frac{x}{D}\right) \quad (7)$$

Equations (3) becomes $$E(x) = g(u) = \sum_{l=1}^{N} G_l e^{-i\Delta\Phi_l} e^{-i2\pi l u} \quad (8)$$

with the inversed Fourier transform relationship $$G_l e^{-i\Delta\Phi_l} = \int_{-\frac{1}{2}}^{\frac{1}{2}} g(u) e^{i2\pi l u} du \quad (9)$$

Applying the inversed Fourier transformation in the frequency domain $$\left(\text{i.e. } u = \frac{m\Delta f}{f_c}\right)$$

to Equation (6) and employing the theorem of convolution results in $$\tilde{A}_l = \frac{m}{f_c} \int_{-\frac{f_c}{2m}}^{\frac{f_c}{2m}} A(\Delta f) e^{i2\pi l \frac{m}{f_c} \Delta f} d(\Delta f) = G_l P_l e^{-i\Delta\Phi_l} \quad (10)$$

where P$_l$ represents, with an approximation of a factor, the amplitude distribution on the grating plane if the light is launched into the output waveguide and propagates in the inversed direction. It is given by $$P_l = D \int_{-\frac{f_c}{2m}}^{\frac{f_c}{2m}} p(D\Delta f)(e)^{i2\pi l \frac{m}{f_c} \Delta f} d(\Delta f) \quad (11)$$

Note that the above integrations are performed over the free spectral range $$\left(\Delta f_{FSR} = \frac{f_c}{m}\right).$$

The complex amplitude of the output spectrum is given by $$A(\Delta f) = |A(\Delta f)|e^{i\varphi(\Delta f)} = \sum_{l=1}^{N} \tilde{A}_l e^{-i2\pi l \frac{m}{f_c}\Delta f} \quad (12)$$

From Equation (10) and (12), following set of Fourier transform and inversed Fourier transform relationships result:

$$|A(\Delta f)|e^{i\varphi(\Delta f)} = \sum_{l=1}^{N} G_l P_l e^{-i\Delta\Phi_l} e^{-i2\pi l \frac{m}{f_c}\Delta f} \quad (13a)$$

$$G_l P_l e^{-i\Delta\Phi_l} = \frac{m}{f_c} \int_{-\frac{f_c}{2m}}^{\frac{f_c}{2m}} |A(\Delta f)|e^{i\varphi(\Delta f)} e^{i2\pi l \frac{m}{f_c}\Delta f} d(\Delta f) \quad (13b)$$

Note that in the discrete Fourier transformation formula pair, the inversed Fourier transform is usually also written as a discrete series of N terms. Although in numerical calculations performed heretofore the integration in Equation (13b) is also performed in discrete form, it is represented above in the integration form because a much larger number of sampling points than the number of grating elements N are necessary in the spectral domain in order to properly describe a desired passband spectral response with sharp transitions. Of course, the number of sampling points relates to the acceptable level of error, and so forth.

For given input and output waveguide parameters and grating geometry, the amplitude distributions G$_l$ and P$_l$ at the grating plane are calculated. According to the method the phase distribution ΔΦ$_l$ is found so that |A(Δf)| has a desired shape using the spectral phase distribution ψ(Δf) as a free adjustable parameter.

The above problem was solved numerically using an iterative Fourier transform method similar to the one used for phase retrieval problem in diffractive optics where the phase distributions in the diffraction and imaging planes are sought based on known intensity distributions (see for example, "A practical algorithm for the determination of phase from image and diffraction plane pictures", by R. W. Gerchberg and W. O. Saxton, Optik 35, pp. 237–246, 1972). Of course, other numerical methods may be employed if they also provide solutions to the above problem. An example implementation of the method applied to the present problem is shown in the flow diagram of FIG. 3.

Before starting the iterative Fourier transform procedure, the effective amplitude distributions at the grating plane G$_l$ and P$_l$ are calculated. A random phase distribution between $\pi$ and $-\pi$ is generated as an initial estimate of the spectral phase function ψ$_0$(Δf). The desired spectrum amplitude |A(Δf)| is also defined. For the purpose of passband flattening, the function |A(Δf)| preferably comprises a passband region with a flat spectral response within $|\Delta f| \leq \Delta f_{PB}/2$, a transition region $\Delta f_{PB}/2 \leq |\Delta f| \leq \Delta f_{PB}/2 + \Delta f_T$ where the transmission drops from the peak to zero, and zero elsewhere. The function is normalized so that the integration of $|A(\Delta f)|^2$ over the free spectral range has the same value as the integration of the original spectrum before the passband flattening.

The iteration procedure starts by constructing the complex spectrum $A_j(\Delta f)=|A(\Delta f)|e^{i\psi_{j-1}(\Delta f)}$, where j is the iteration number. The inversed Fourier transform is then performed using Equation (13b). The phase term ΔΦ$_l$ of the resulting complex function is combined with the known product G$_l$P$_l$ to form the complex grating plane amplitude $G_l P_l e^{-i\Delta\Phi_l}$. The Fourier transform Equation (13a) is then applied to obtain $|A'_j(\Delta f)|e^{i\psi_j(\Delta f)}$. The resulting spectral phase distribution $\psi_j(\Delta f)$ is combined again with the desired spectral amplitude $|A(\Delta f)|$ to form the new estimate of the complex spectrum $A_{j+1}(\Delta f)=|A(\Delta f)|e^{i\psi_j(\Delta f)}$. The process is repeated until $|A'_j(\Delta f)|$ is close to the desired spectrum amplitude $$|A(\Delta f)| (\text{e.g. } \varepsilon = \int_{-\frac{f_c}{2m}}^{\frac{f_c}{2m}} (|A'_j(\Delta f) - A(\Delta f)|^2) d(\Delta f)$$

is smaller than a predefined tolerance) or until a predetermined number of iterations has been achieved.

Figure 4:
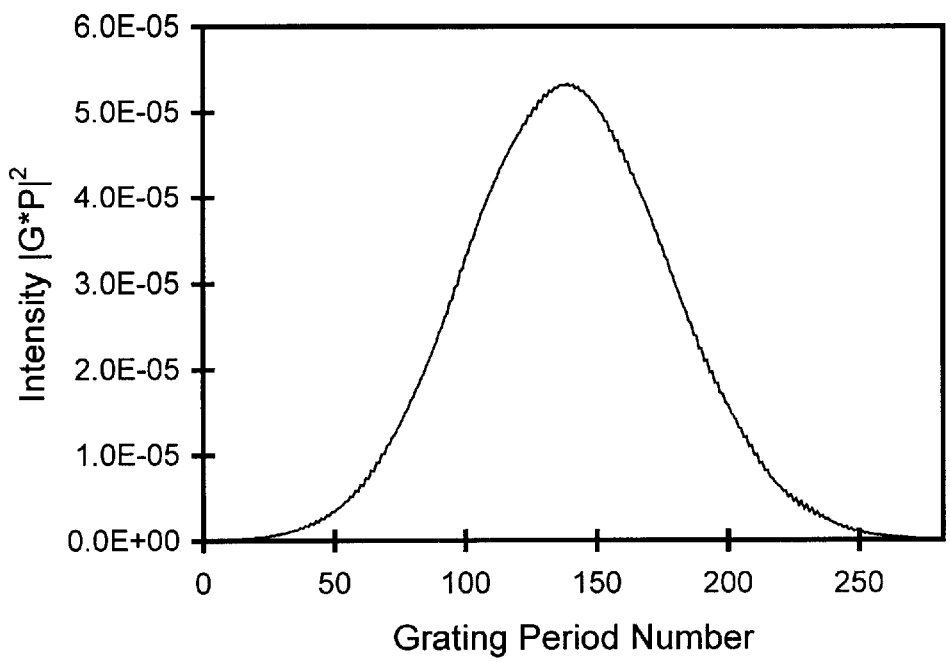
FIG. 4 is the product of the effective intensity distributions at the grating plane produced by input and output waveguide modes for an exemplary device.
Figure 5A:
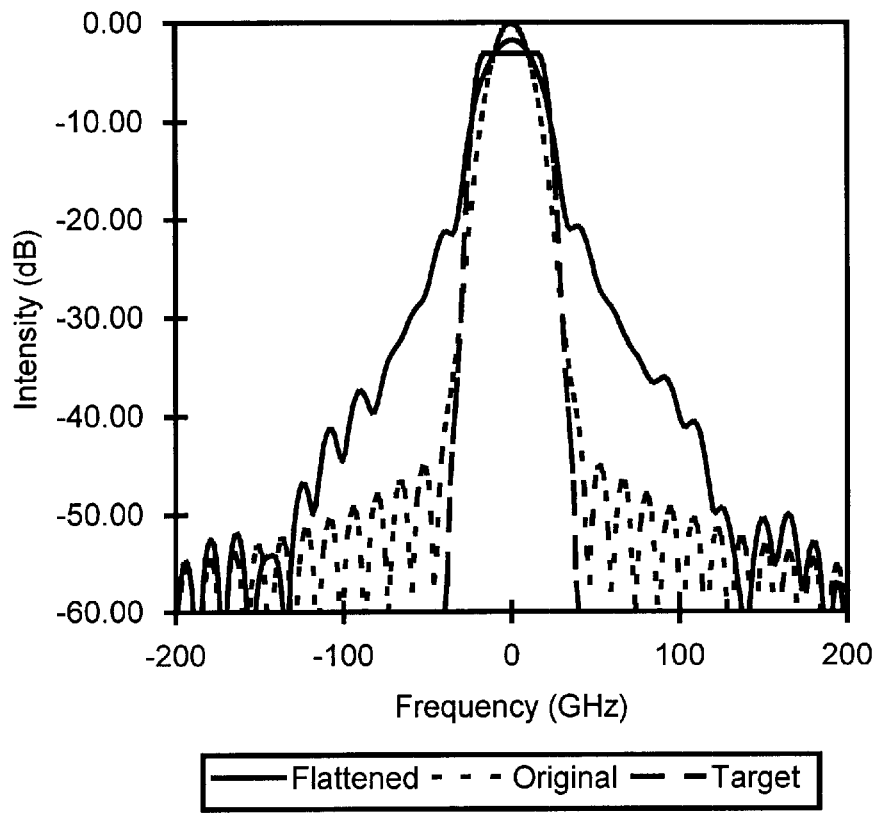
FIG. 5a is a graph of the intensity versus frequency showing the original (dashed line), target long dashed line) and flattened (solid line) spectra for the same example grating as for FIG. 4, wherein the flattened spectrum was obtained using the design method of FIG. 3.
Figure 5B:
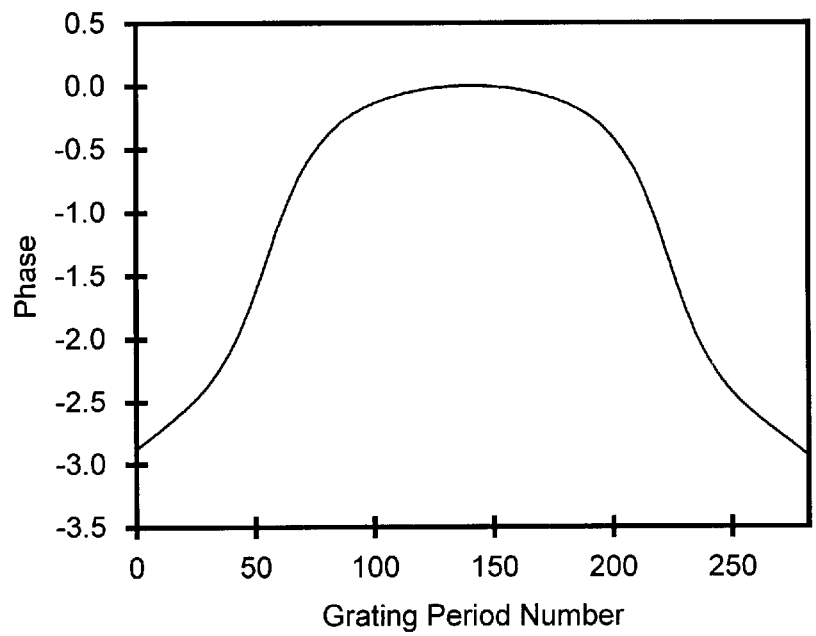
FIG. 5b is a graph of phase versus grating period number corresponding to the flattened spectra in FIG. 5a obtained using the method of FIG. 3.

The above method usually converges rapidly to a solution ($\varepsilon \approx 0$) if the solution exists, or, if the solution does not exist, to a stable state for which the criteria $\varepsilon$ changes very little as the iterations proceed. For the purpose of flattening the passband spectral response, unfortunately, when the stable state is reached with the above method, the spectral response is usually not satisfactory. As an example, above method was applied to a practical etched diffraction grating with 282 reflecting facets. The input and output waveguides were single-mode and the resulting amplitude distributions $G_l$ and $P_l$ at the grating plane are approximately Gaussian. The distribution of the product $|G_l P_l|^2$ is shown in FIG. 4. The geometry of the grating is designed such that the widths of the Gaussian distributions are smaller than the grating size so that most of the optical power is received by the grating. If the desired passband spectrum has a flat-top and sharp transitions as the dashed line in FIG. 5a, the above method results in a spectral response as shown as the solid line in FIG. 5a. The corresponding grating phase distribution is shown in FIG. 5b. While the passband top within the spectral response is far from satisfactory in terms of flatness, the transition slopes are greatly degraded. A flatter passband top is obtained when the target passband is set to be wider, but at the expense of even worse transition slopes and much lower peak transmission. These results are qualitatively similar to the ones obtained with the method in which a sub-parabolic phase term is added in the grating, as reported in the paper by F. Farjady et al. (1998).

Figure 3:
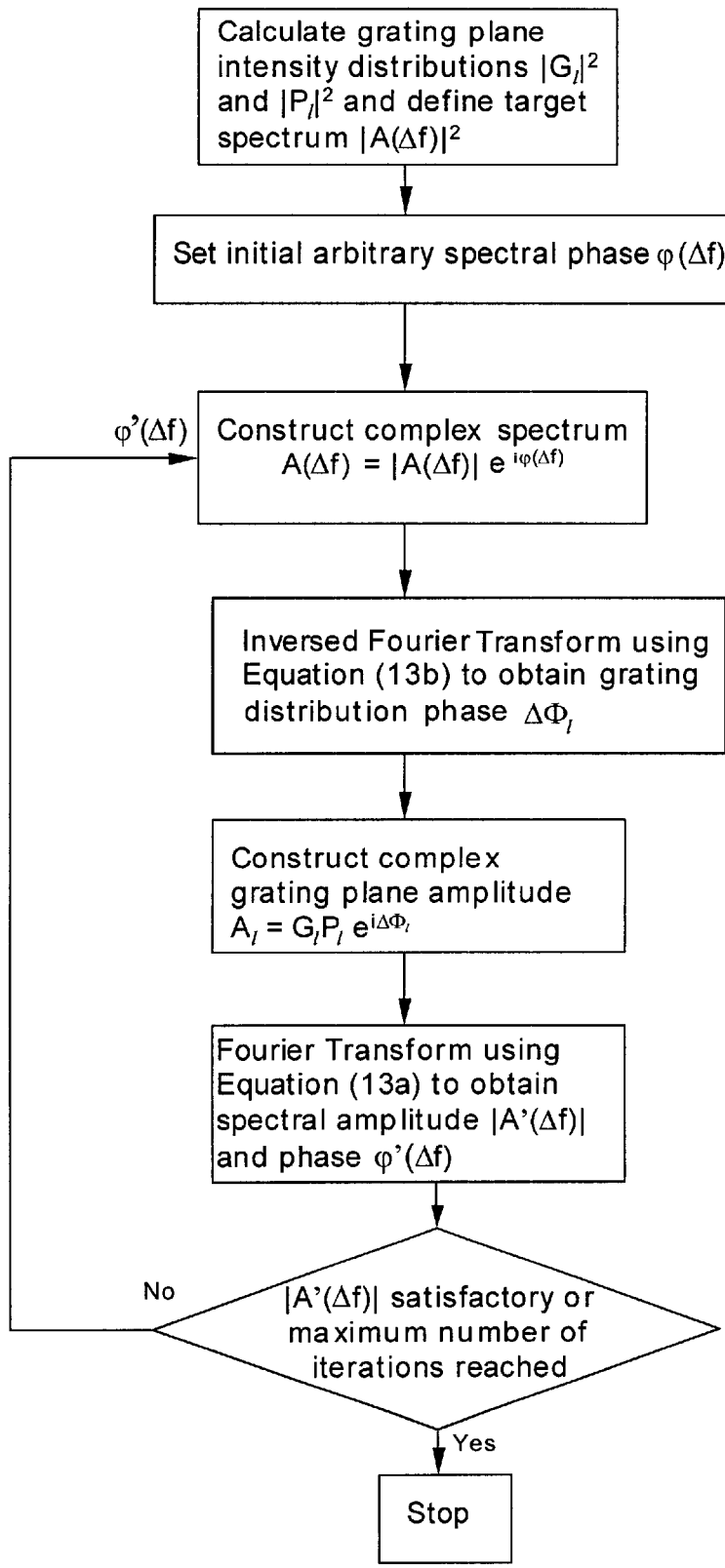
FIG. 3 is simplified flow diagram of a method using the iterative Fourier Transform method for passband spectrum modification.
Figure 6:
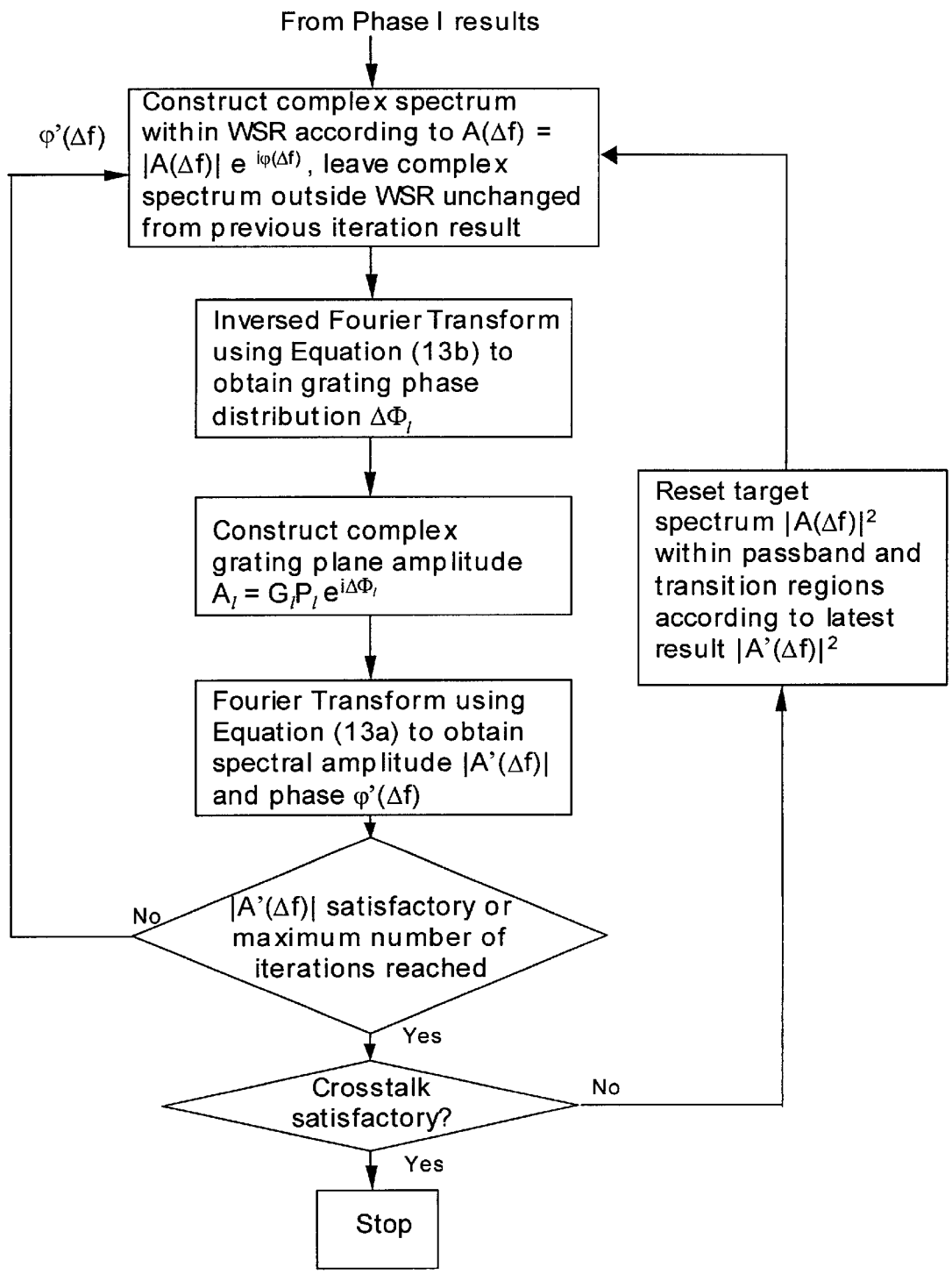
FIG. 6 is a simplified high level flow diagram of an improved computer implemented method (phase II) using the iterative Fourier Transform method for the phase induced passband flattening and transition sharpening technique of the present invention.

To solve the above problem, the method was further improved. The iterations are divided into two phases. In the first phase, the method of FIG. 3 is used, i.e., the complex spectrum is constructed according to $A_j(\Delta f)=|A(\Delta f)|e^{i\psi_{j-1}(\Delta f)}$ at the beginning of each iteration. After the iteration reaches a stable state, the second phase starts employing a method shown in FIG. 6. The complex spectrum is now constructed according to $$A_j(\Delta f) = \begin{cases} |A(\Delta f)|e^{i\varphi_{j-1}(\Delta f)} & |\Delta f| \le \Delta f_{WSR} \\ |A'_{j-1}(\Delta f)|e^{i\varphi_{j-1}(\Delta f)}, & \Delta f_{WSR} < |\Delta f| \le \Delta f_{FSR}/2 \end{cases} \quad (14)$$

where $$\Delta f_{FSR} = \frac{f_c}{m}$$

is the free spectral range and $\Delta f_{WSR}$ is referred to as the working spectral range within which the spectral response is to have the desired spectral function $|A(\Delta f)|$. By using Equation (14), no constraint is imposed on the spectral response outside of the working spectral range. This allows the method to converge further toward the desired spectral function within the working spectral range.

Since the spectral response outside the working spectral range becomes freely adjustable instead of zero as in the ideal case, some optical power is lost. By using the method in Phase I preceding the Phase II iterations, such loss is minimized.

A side effect of this method is that the working spectral range is reduced to less than half of the free spectral range (e.g. $\Delta f_{WSR}=0.45\Delta f_{FSR}$). In order to avoid crosstalk due to the non-zero response outside the working spectral range, all WDM channels must fall within a frequency interval less than $\Delta f_{WSR}$. This is usually not a problem for most applications because $\Delta f_{FSR}$, and consequently $\Delta f_{WSR}$ can be increased by reducing the grating order. In fact, most devices are designed such that only a small portion of the free spectral range is used in order to reduce the non-uniformity of the peak responses across different channels. For example, a non-uniformity of 3 dB occurs if the full FSR is used.

After the Phase II iterations reach a stable state as characterized by a slowly varying $$\varepsilon = \int_{-\frac{\Delta f_{WSR}}{2}}^{\frac{\Delta f_{WSR}}{2}} (|A'_j(\Delta f) - A(\Delta f)|^2) d(\Delta f),$$

the passband spectral response and the transition slopes are usually quite satisfactory, even though they are not exactly the same as the artificially constructed ideal function $|A(\Delta f)|$. The responses within the WSR but outside the passband and transition regions are also quite small, but they are still not satisfactory due to stringent crosstalk requirements (e.g. $<<-30$ dB). To reduce the background noise within the WSR, target spectrum $|A(\Delta f)|$ is reset within the passband and the transition regions according to the latest result, that is $$|A(\Delta f)| = \begin{cases} |A'_j(\Delta f)| & |\Delta f| \le \Delta f_{PB}/2 + \Delta f_T \\ 0, & \Delta f_{PB}/2 + \Delta f_T < |\Delta f| \le \Delta f_{FSR}/2 \end{cases} \quad (15)$$

where j is the iteration number. The iterations continue until both the passband spectrum and the crosstalk level are satisfactory.

Figure 7A:
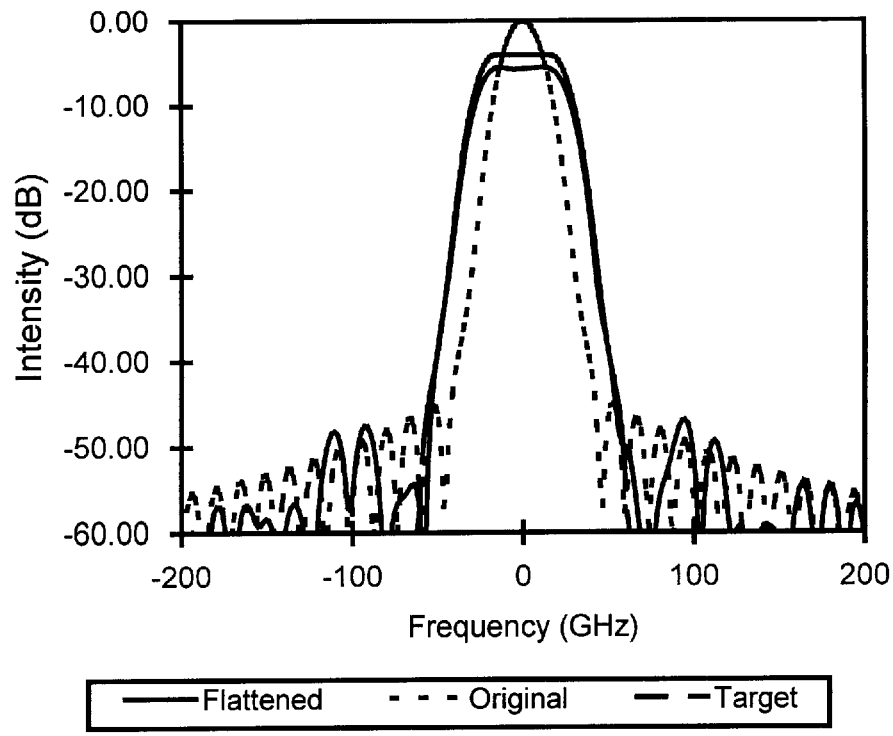
FIG. 7a is a graph of the intensity versus frequency showing the original (dashed line), target (long dashed line) and flattened (solid line) spectra for the same example grating as for FIG. 5 wherein the flattened spectrum is obtained using the improved method of FIG. 6.
Figure 7B:
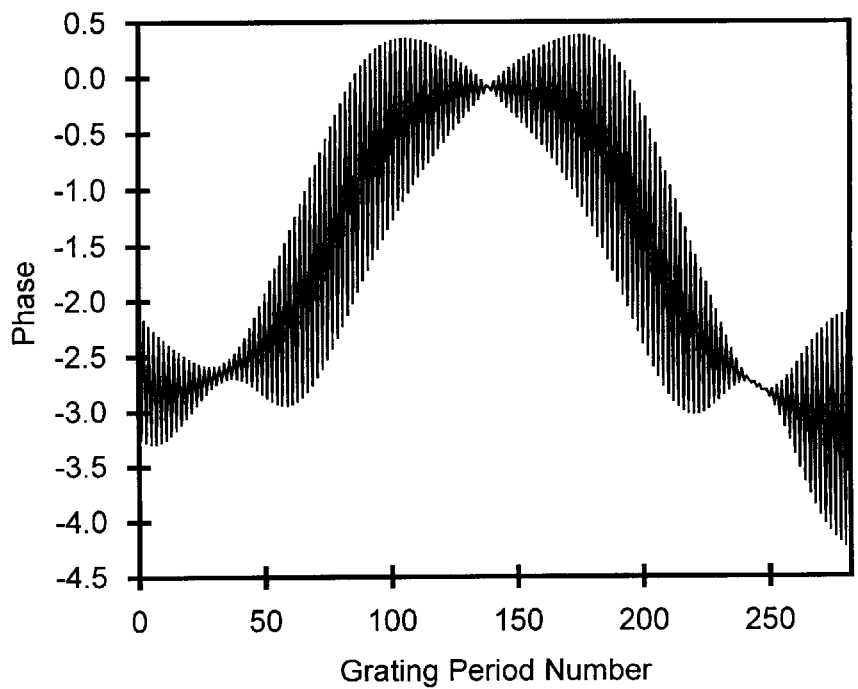
FIG. 7b is a graph of phase versus grating period number corresponding to the flattened spectra in FIG. 7a obtained using the method of FIG. 6.
Figure 7C:
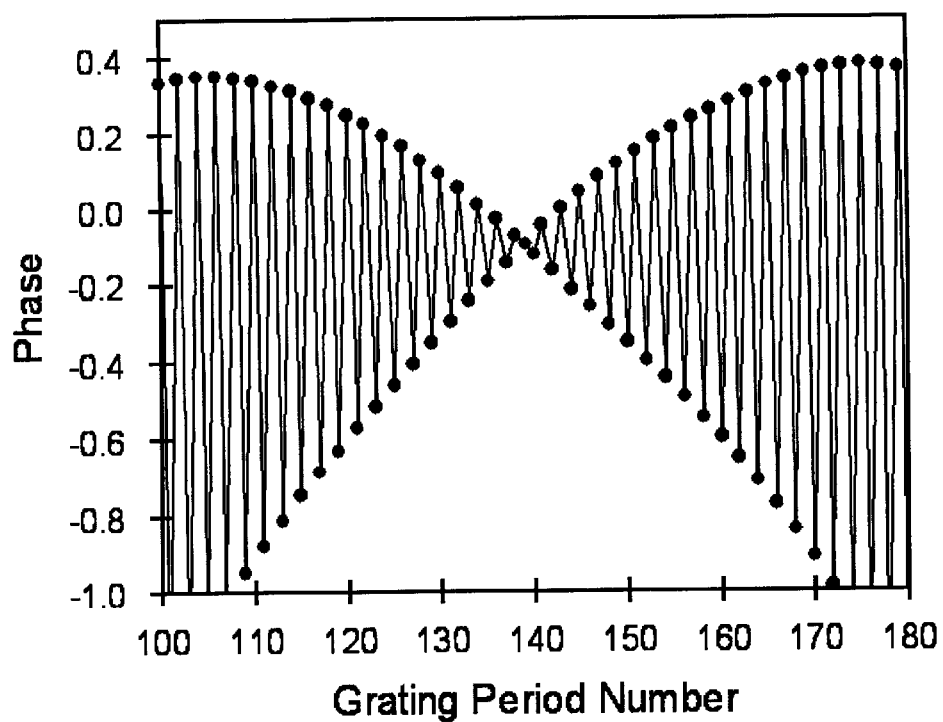
FIG. 7c is an expanded view of the diagram of FIG. 7b in the central region.

FIG. 7a shows a spectrum resulted from the above improved method for the same grating example as used for FIG. 5. The initial target spectrum is also shown as the dashed line and the original spectrum is shown as the dotted line. In this example, the initial target spectrum is constructed by adding a flat passband of 35 GHz in the middle of the original passband spectrum. In the resulted spectrum, the $-1$ dB passband width $\Delta f_{PB}$ is increased from 11.2 GHz to 41.6 GHz compared to the original spectrum. FIG. 7b shows the grating phase distribution resulting from the above method for obtaining the spectrum (solid line) in FIG. 7a. FIG. 7c gives the expanded view of the phase distribution with the data point for each grating element marked by a dot. The phase distribution has slowly varying envelope function similar to FIG. 5b, but with a superimposed oscillatory function with the period of oscillation equal to 2 grating elements. The amplitude of the phase oscillation is itself oscillatory with a period inversely proportional to the target passband width and is almost zero at the center of the grating.

Figure 8A:
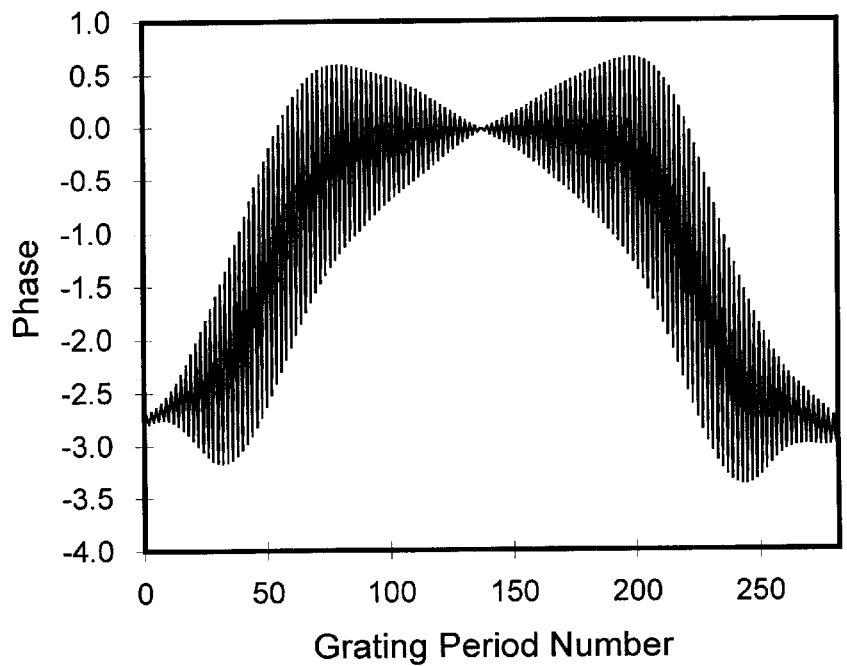
FIG. 8a is another graph of phase versus grating period number for obtaining flattened passband with sharp transitions for the same grating as for FIG. 7.
Figure 8B:
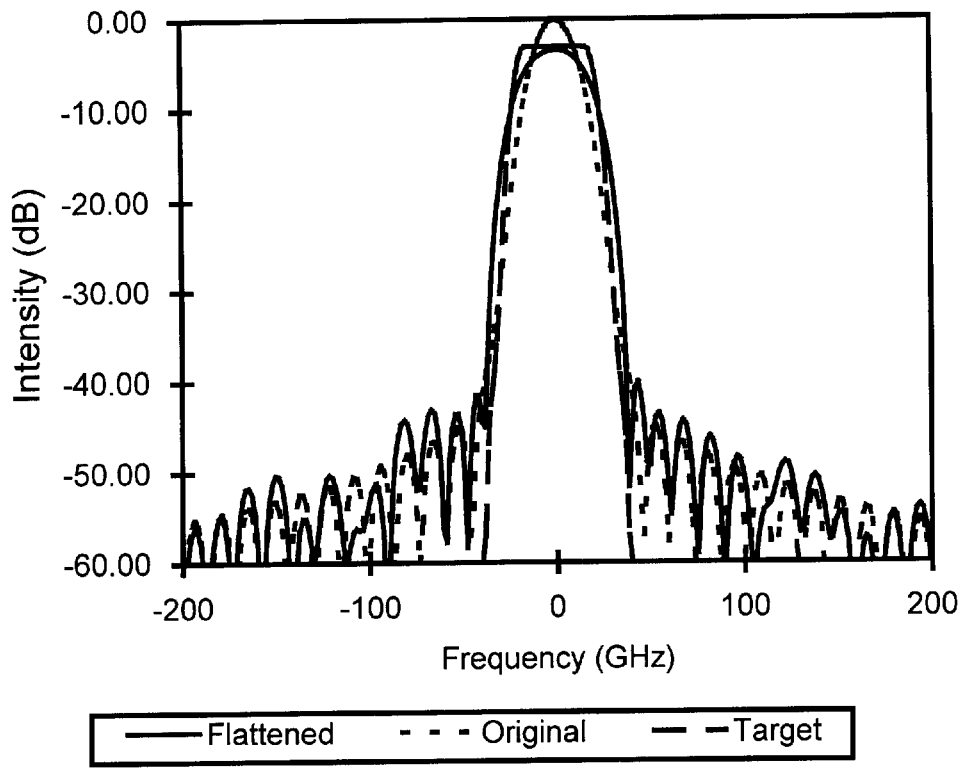
FIG. 8b is the passband flattened spectra (solid line) obtained with the phase distribution of FIG. 8a wherein the original (dashed line) and the target (long dashed line) spectra are also shown.
Figure 8C:
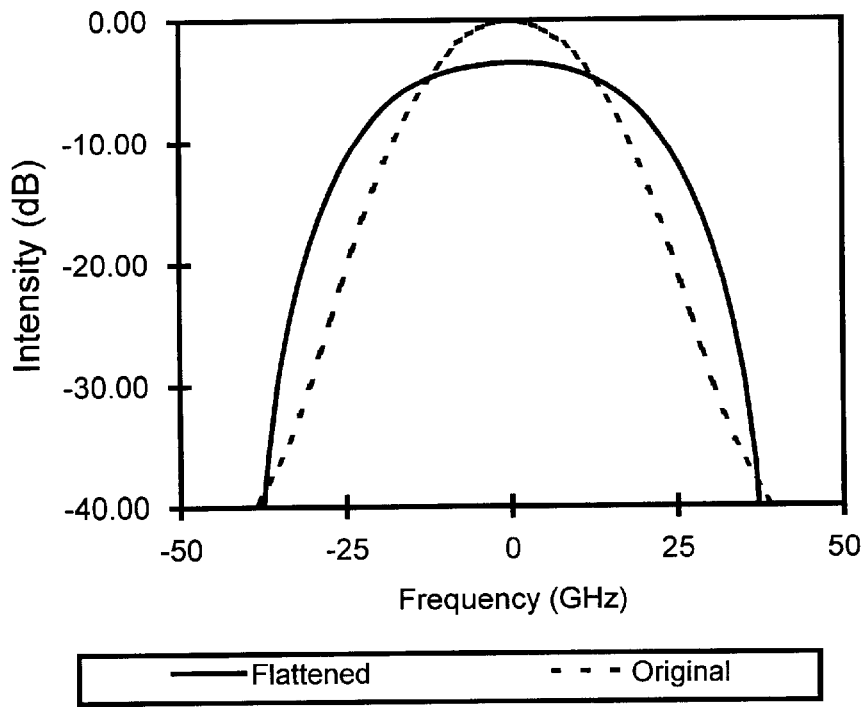
FIG. 8c is expanded view of the original (dashed line) and flattened (solid line) spectra of FIG. 8b.

Using the technique of the present invention, the passband width and shape are manipulated simply by varying the phase distribution at the grating. FIG. 8a shows another example of phase distribution resulting from the above method for the same grating, for obtaining the spectrum as shown in FIG. 8b. In this case, the passband transition width in the initial target spectrum is reduced by half with respect to the original spectrum. Compared to the original spectrum, the passband $\Delta f_{PB}$ of the resulted spectrum is increased from 11.2 GHz to 22.8 GHz. The passband flatness $$\left(\frac{df}{dI}\right)_{-1dB}$$

is increased from 3 GHz/dB to 5.2 GHz/dB, and the transition sharpness $$\left(\frac{dI}{df}\right)_{-30dB}$$

is increased from 1.6 dB/GHz to 4 dB/GHz. The expanded view of the spectrum is shown in FIG. 8c.

For given single-mode input/output waveguides, the passband broadening is inherently associated with a reduction in the peak intensity, no matter what technique is used. The wider the passband, the lower the peak response. If no optical loss is introduced in the grating elements by the passband broadening technique, the integration of the spectral response over a free spectral range should be a constant. In the example of FIG. 8, the peak response of the flattened spectrum is reduced by about 3.4 dB compared to the original spectrum, of which less than 1 dB is the excess loss due to the non-zero response outside the working spectral range.

It should also be pointed out that the passband transition width cannot be infinitely reduced to zero. This is because a practical grating has a limited number of phase elements. However, as shown in the example of FIG. 8, the passband flatness and the transition slopes can be significantly improved with minimum loss and crosstalk noise using the technique of the present invention.

Figure 9A:
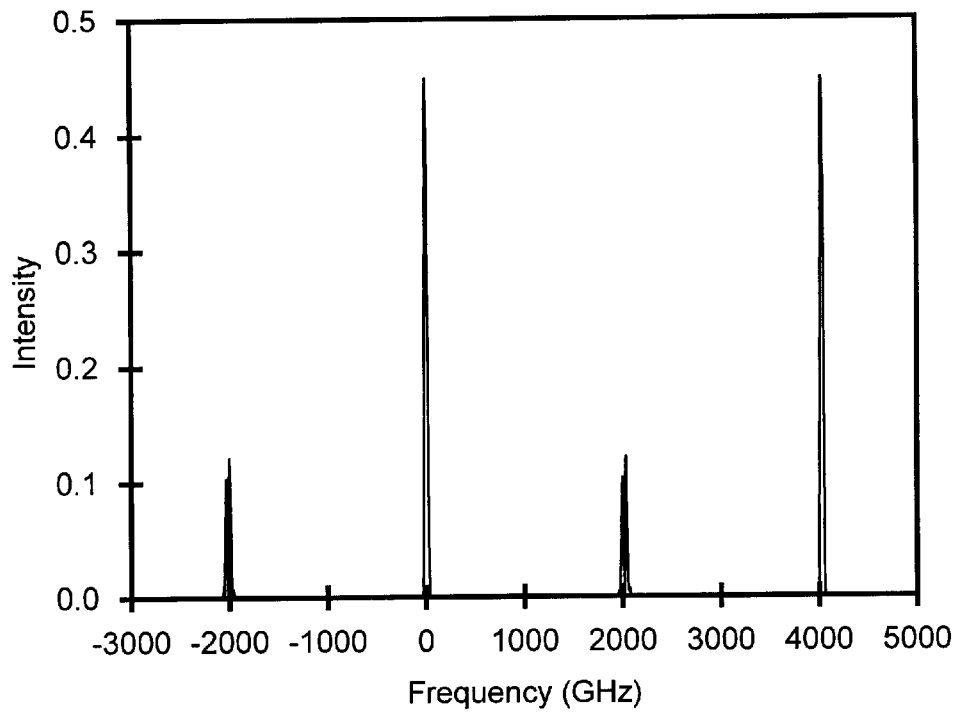
Figure 9B:
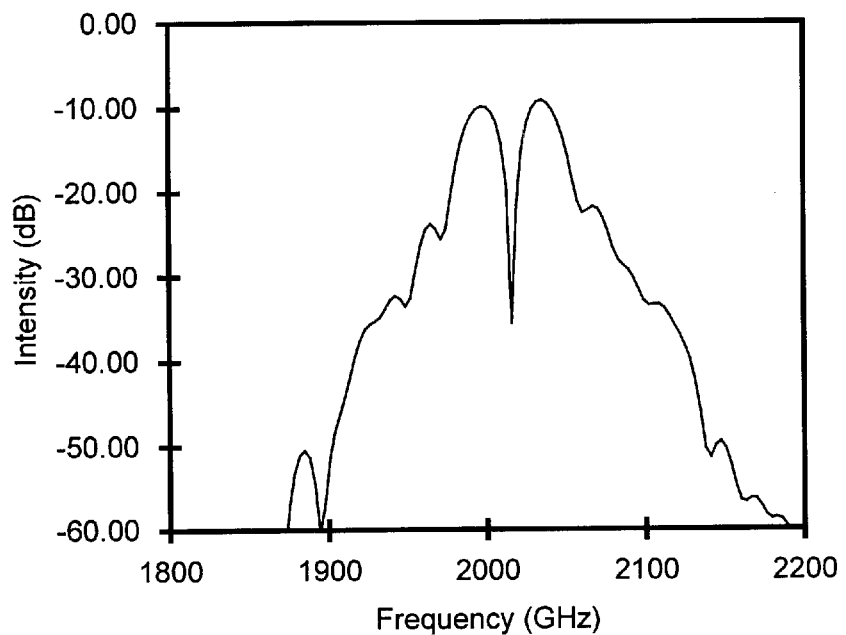
FIG. 9b is the expanded view of the spectrum of FIG. 9a in logarithmic scale in the dummy spectral region (outside the working spectral range); and, FIGS. 10a and 10b are simplified diagrams of grating devices including a transmissive grating in FIG. 10a and a reflective grating in FIG. 10b.

FIG. 9a shows the complete spectrum of the grating over a free spectral range. Two dummy peaks with sidelobes occur in the middle of the FSR between two diffraction orders. The details of the dummy spectrum are expanded in FIG. 9b in logarithmic scale. The dummy peaks are outside of the working spectral range and the only purpose of their existence is to produce a desired spectral response in the working spectral range, particularly in the passband. The two dummy peaks may be symmetric in the case of symmetric gratings such as AWGs. They are slightly asymmetric in the case of curved reflection gratings due to different facet sizes and different distances to input/output waveguides between up and lower half of the grating. This asymmetry also results in the slightly asymmetric phase distributions as shown in FIGS. 7b and 8a. The oscillatory phase variation between adjacent grating elements is related to the fact that the dummy spectral range is located in the middle of the FSR.

According to Equations (13), an alternative method of obtaining the desired spectral function $|A(\Delta f)|$ is by setting $\psi(\Delta f)=0$ and by introducing losses in the grating elements so that the product $G_l P_l$ follows the amplitude of the Fourier transform of the function $|A(\Delta f)|$ (e.g. sinc function in the case $|A(\Delta f)|$ is a rectangular function). This is similar to the method reported by Okamoto et al (Optics Lett. 20, pp. 43–45, 1995). However, by adjusting the product $G_l P_l$ instead of the simple amplitude distribution $G_l$ at the grating, the convolution with the output mode profile is taken into account, thus allowing the passband spectrum to have sharper transitions. Of course, such a method is less desirable in many instances since it results in losses introduced by the gratings which can, at least in part, be obviated by adjusting phase instead.

Though the invention is described with reference to the diagrams it is possible to orient the waveguide grating device to work in reflection—where the output waveguides are on the same side of the grating as the input waveguides, in transmission, etc.

Further, the use of the invention within other optical components than those recited herein is possible as the component is functionally similar to many other waveguide grating devices.

In an alternative embodiment, the desired spectral response—the target response—is not a broad flat passband but is a different response. Because the mode profiles of both the input and output waveguides are accounted for in the design process, it is possible to match any of a number of spectral responses depending only on design requirements. Of course, as indicated above, when the target spectrum is within a working spectral range less than the free spectral range of the waveguide grating, an improved spectral response as compared to the target spectral response results.

Numerous other embodiments may be envisaged without departing from the spirit or scope of the invention.

Further, the use of the invention within other optical components than those recited herein is possible as the component is functionally similar to many other waveguide grating devices.

In an alternative embodiment, the desired spectral response—the target response—is not a broad flat passband but is a different response. Because the mode profiles of both the input and output waveguides are accounted for in the design process, it is possible to match any of a number of spectral responses depending only on design requirements. Of course, as indicated above, when the target spectrum is within a working spectral range less than the free spectral range of the waveguide grating, an improved spectral response as compared to the target spectral response results.

Numerous other embodiments may be envisaged without departing from the spirit or scope of the invention.

What is claimed is:

1. A wavelength grating device comprising:
    a first port for receiving an optical signal having a plurality of channels therein, channels separated by a channel spacing within the frequency domain;
    a plurality of second ports for receiving optical signals each having a single channel;
    a grating region comprising a plurality of grating elements within the waveguide, the grating elements disposed for varying a phase of light propagating between the first port and one of the plurality of second ports via the grating elements, the phase variation between adjacent grating elements different than a multiple $2\pi$, the difference being the sum of a slow-varying central phase variation and an oscillatory phase variation, resulting in a spectral response for the waveguide device that is substantially similar to a target spectral response within a working spectral range.

2. A waveguide grating device according to claim 1 having a spectral response that is substantially flat within a passband thereof.

3. A waveguide grating device according to claim 2 having steep sloping edges within the spectral response about the passband.

4. A waveguide grating device according to claim 3 wherein the spectral response of the waveguide device accounts for field distribution profiles of the first port and of the second ports of the device.

5. A waveguide grating device according to claim 4 having a spectral response within a working spectral range less than a free spectral range of the device substantially similar to the target spectrum and having a spectral response outside the working spectral range substantially dissimilar to the target spectrum.

6. A waveguide grating according to claim 5 wherein the working spectral range is centred about a central frequency at which there is a substantial frequency response and wherein the spectral response outside the working spectral range includes at least a peak approximately at a middle frequency between two response peaks corresponding to two diffraction orders.

7. A waveguide grating device according to claim 5 wherein the grating is an arrayed waveguide grating.

8. A waveguide grating device according to claim 5 wherein the grating is a curved reflecting grating.

9. A waveguide grating device according to claim 5 wherein the input and output ports are single mode optical waveguides.

10. A waveguide grating device according to claim 5 wherein at least one of the input port and the output ports includes a single mode optical waveguide and a mode profile broadening structure at an end of the single mode waveguide.

11. A waveguide grating device comprising:
a first port for receiving an optical signal having a plurality of channels therein, channels separated by a channel spacing within the frequency domain;
a plurality of second ports for receiving optical signals each having a single channel; and,
a grating region comprising a plurality of grating elements within the waveguide, the grating elements disposed for varying a phase of light propagating between the first port and one of the plurality of second ports via the grating elements, the phase variation between adjacent grating elements different than a multiple of $2\pi$ selected to provide a spectral response of the waveguide grating device including any effects of field distribution profiles of the first port and of the second ports of the device having a substantially flat spectral response within a passband of the device and having steep sloping edges within the spectral response about the passband.

12. A waveguide grating device according to claim 11 wherein the phase variation between adjacent grating elements oscillates about a slow varying central phase variation.

13. A waveguide grating device according to claim 11 wherein the phase variation is determined in dependence upon a target spectral response for the waveguide device.

14. A waveguide grating device according to claim 13 having a spectral response within a working spectral range less than a free spectral range of the device substantially similar to the target spectral response and having a spectral response outside the working spectral range including at least a peak at a frequency wherein no data channel exists.

15. A waveguide grating according to claim 14 wherein the working spectral range is centred about a central frequency at which a channel exists and where there is a substantial frequency response and wherein the spectral response outside the working spectral range includes at least a peak approximately at a middle frequency between two response peaks corresponding to two diffraction orders.

16. A waveguide grating device according to claim 15 having grating elements disposed for varying a phase of light thereon, the phase variation between adjacent grating elements being the sum of:

d) a multiple of $2\pi$;
e) a slow-varying central phase variation;
f) an oscillatory phase variation,
such that adjacent grating elements are disposed to vary the phase in an opposing direction from the central phase variation.

17. A waveguide grating device according to claim 16 wherein the grating is an arrayed waveguide grating.

18. A waveguide grating device according to claim 16 wherein the grating is a curved reflecting grating.

19. A waveguide grating device according to claim 16 wherein the input and output ports are single mode optical waveguides.

20. A waveguide grating device according to claim 16 wherein at least one of the input port and the output ports includes a single mode optical waveguide and a mode profile broadening structure at an end of the single mode waveguide.

21. A waveguide grating device comprising:
a first port for receiving an optical signal having a plurality of channels therein, channels separated by a channel spacing within the frequency domain;
a plurality of second ports for receiving optical signals each having a single channel; and,
a grating region comprising a plurality of grating elements within the waveguide, the grating elements disposed for varying the phase of light propagating between the first port and any of the second ports via the grating elements, the phase and amplitude variations other than multiples of $2\pi$, multiples of $\pi$ and determined in a predetermined manner in order to, in conjunction with the amplitude variation, result in a spectral response of the waveguide device substantially similar within a working spectral range to a target spectral response.

22. A waveguide grating device according to claim 21 wherein the phase and amplitude variation is determined to account for field distribution profiles of the first port and of the second ports of the device.

23. A waveguide grating device according to claim 22 having a spectral response that is substantially flat within a passband thereof.

24. A waveguide grating device according to claim 23 having transitions to and from the passband within the spectral response that are substantially sharp.

25. A waveguide grating device according to claim 24 wherein the effect of convolution of the field distribution of the output port is compensated for such that light exiting from the output port has a spectral response substantially similar to the target spectrum within the passband and the transition regions.

26. A waveguide grating device comprising:
an input port receiving light including a plurality of different signals each at a different wavelength and for providing the light with a first field distribution;
a plurality of grating elements within a grating region for receiving the light having a first field distribution and for dispersing the light in dependence upon a wavelength of the light incidence upon each grating element with a first spectral response dependent upon a phase variation of the light introduced by each grating element;
a plurality of output ports each for receiving light of a predetermined wavelength and for providing therefrom the light having a second field distribution,
wherein a combination of the first spectral response, the first field distribution and the second field distribution form a substantially flat spectral response within a passband of the device and steep sloping edges within the spectral response about the passband and substantially zero response elsewhere within a working spectral range.

27. A waveguide grating according to claim 26 wherein the working spectral range is less than the free spectral range and wherein the spectral response of the waveguide grating includes a peak outside the working spectral range of the waveguide grating.

28. A method of designing a waveguide grating device having an input port, an output port, and a plurality of grating elements comprising the steps of:
- a) calculating a modulus product of a grating plane amplitude distribution of light diffracted from the input port and an inverse Fourier transform of a field distribution of the output port;
- b) providing a target spectral response for the waveguide grating device;
- c) determining a phase distribution for grating elements forming the waveguide grating such that the phase distribution at the output grating plane in conjunction with the field distribution of the output port results in a spectral response of the waveguide grating device substantially similar to the target spectral response within a working spectral range; and,
- d) providing the determined phase distribution of the grating elements as the design.

29. A method of designing a waveguide grating as defined in claim 28 wherein the step (c) comprises the steps of:
- c1) providing a working spectral range not larger than the free spectral range of the waveguide grating;
- c2) providing an initial estimate of complex spectrum;
- c3) determining grating phase distribution using an inverse Fourier transform of the complex spectrum;
- c4) determining an effective complex grating plane amplitude from the grating phase distribution and the product calculated in step a);
- c5) determining a spectral amplitude and a new spectral phase using the Fourier transform of the complex grating plane amplitude;
- c6) determining a new complex spectrum within the working spectral range based on the target spectral amplitude and the determined spectral phase and having complex spectrum portions outside the working spectral range substantially similar to those resulting from a current iteration; and,
- c7) iterating steps (c3) through (c6) until the spectral amplitude is within predetermined limits with respect to the target spectrum.

30. A method of designing a waveguide grating as defined in claim 29 wherein only the phase distribution for the grating elements is determined in designing the waveguide grating.

31. A method of designing a waveguide grating device as defined in claim 29 wherein the phase distribution combined with amplitude distribution modification caused by the grating elements is determined in designing the waveguide grating.

32. A method of designing a waveguide grating device as defined in claim 29 wherein the free spectral range of the waveguide grating is the working spectral range.

33. A method of designing a waveguide grating device as defined in claim 29 wherein a portion less than the whole of the free spectral range of the waveguide grating forms the working spectral range wherein the spectral response is similar to the target spectral response within the working spectral range and different from the target spectrum outside the working spectral range.

34. A method of designing a waveguide grating device as defined in claim 33 wherein in the step (c) the phase variations are determined as a sum of:
- g) a multiple of $2\pi$;
- h) a slow-varying central phase variation;
- i) an oscillatory phase variation, such that adjacent grating elements are disposed to vary the phase in an opposing direction from the central phase variation.

35. A waveguide grating device designed according to claim 28.

36. A method of designing a waveguide grating device having an input port, an output port, and a plurality of grating elements comprising the steps of:
- a) calculating a modulus product of a grating plane amplitude distribution of light diffracted from the input port and an inverse Fourier transform of a field distribution of the output port;
- b) providing a target spectral response;
- c) providing an initial estimate of spectral phase;
- d) determining a complex spectrum based on the target spectral response and the provided spectral phase;
- e) determining grating phase distribution using an inverse Fourier transform of the complex spectrum;
- f) determining an effective complex grating plane amplitude based on the grating phase distribution and the product calculated in step (a);
- g) performing a Fourier transform of the complex grating plane amplitude to determine a spectral amplitude and a new estimate of spectral phase; and,
- h) iterating steps (d) through (g) until a predetermined condition is met;
- i) providing the determined phase distribution of the grating elements as the design when the spectral amplitude is within predetermined limits with respect to the target spectral response.

37. A method of designing a waveguide grating as defined in claim 36 comprising further steps of:
- i) providing a working spectral range less than the free spectral range of the waveguide grating;
- j) providing an initial estimate of complex spectrum determined in steps (a) through (h);
- k) determining grating phase distribution using an inverse Fourier transform of the complex spectrum;
- l) determining an effective complex grating plane amplitude from the grating phase distribution and the product calculated in step (a);
- m) determining a spectral amplitude and a new spectral phase using the Fourier transform of the complex grating plane amplitude;
- n) determining a complex spectrum within the working spectral range based on the target spectral amplitude and the determined spectral phase and having complex spectrum portions outside the working spectral range substantially similar to those resulting from a current iteration; and
- o) iterating steps (k) through (n) until the spectral amplitude is within predetermined limits with respect to the target spectrum.

38. A method of designing a waveguide grating device as defined in claim 37 wherein the iterations form an iterative process and wherein the iterative process includes the step of ending the iterative process after a predetermined number of iterations and performing one of varying the working spectral range, varying the target spectral response, and varying initial estimate of complex spectrum to promote convergence of the iterative process toward the target spectral response.

39. A waveguide grating device designed according to the method of claim 37.

40. A method of designing a waveguide grating comprising the steps of:
   a) calculating the modulus product of a grating plane amplitude distribution of light diffracted from the input port and the inversed Fourier transform of the field distribution of the output port;
   b) providing a target spectral response;
   c) providing a working spectral range less than the free spectral range of the waveguide grating;
   d) determining an initial estimate of a complex spectrum;
   e) determining grating phase distribution using an inverse Fourier transform of the complex spectrum;
   f) determining an effective complex grating plane amplitude from the grating phase distribution and the product calculated in step (a);
   g) determining a spectral amplitude and a new spectral phase using the Fourier transform of the complex grating plane amplitude;
   h) determining a complex spectrum within the working spectral range based on the target spectral amplitude and the determined spectral phase and having complex spectrum portions outside the working spectral range substantially similar to those resulting from a current iteration; and,
   i) iterating steps (e) through (h) until the spectral amplitude is within predetermined limits with respect to the target spectral response.

41. A method of designing a waveguide grating as defined in claim 40 comprising the steps of:
   evaluating the crosstalk within the designed grating; and,
   when the crosstalk is within predetermined limits, providing the determined grating phase distribution as a design for the waveguide grating.

42. A method of designing a waveguide grating as defined in claim 41 comprising the step of:
   when the crosstalk is other than within predetermined limits, redetermining the target spectral response partially according to a current spectrum and recommencing the method starting at step (e).

43. A method of designing a waveguide grating as defined in claim 41 comprising the step of:
   when the crosstalk is other than within predetermined limits, providing a new narrower working spectral range and recommencing the method starting at step (e).

44. A method of designing a waveguide grating device as defined in claim 41 wherein phase variations of the grating elements are determined as a sum of:
   a) a multiple of $2\pi$;
   b) a slow-varying central phase variation;
   c) an oscillatory phase variation,
such that adjacent grating elements are disposed to vary the phase in an opposing direction from the central phase variation.

45. A waveguide grating device designed according to the method of claim 40.

* * * * *